Nov. 20, 1928.    1,692,625
L. H. CASKEY
MEANS AND METHOD OF PACKING FRUITS, VEGETABLES, AND OTHER PRODUCTS
Filed Feb. 18, 1928    2 Sheets-Sheet 2
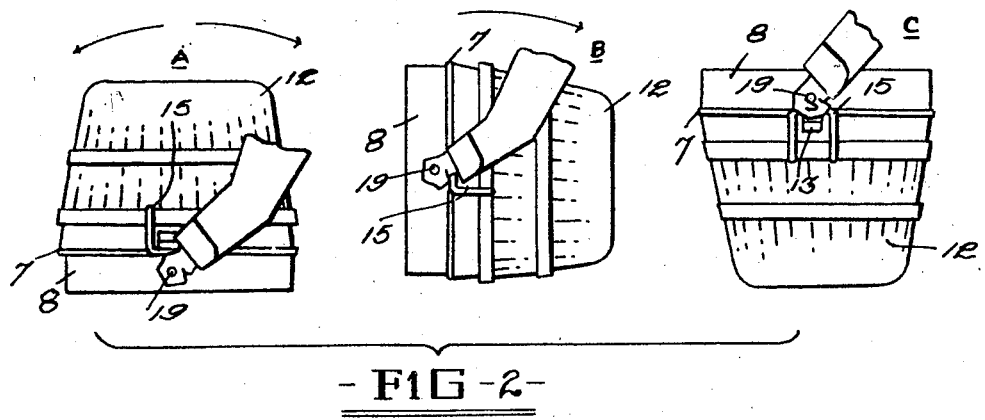
- FIG -2-
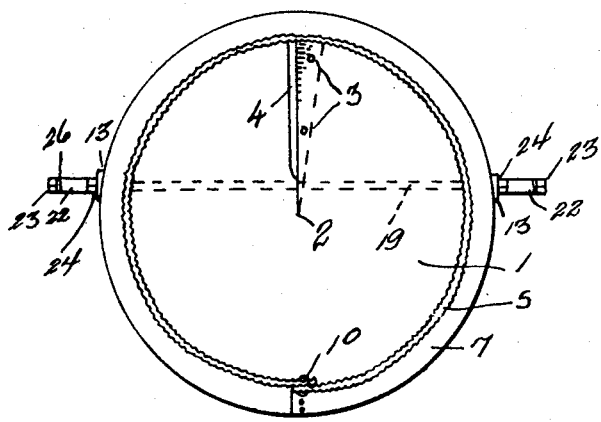
- FIG -3-
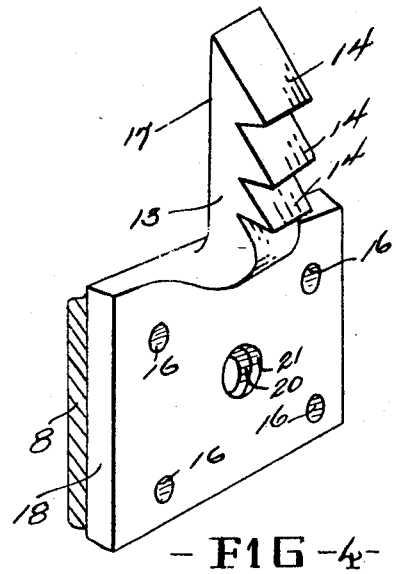
- FIG -4-
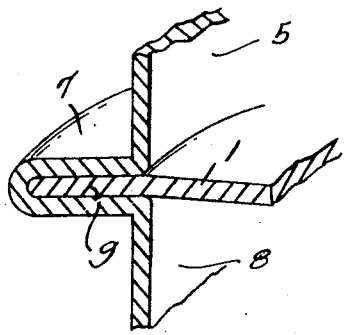
- FIG -5-
Inventor
LUTHER H. CASKEY, Patented Nov. 20, 1928.

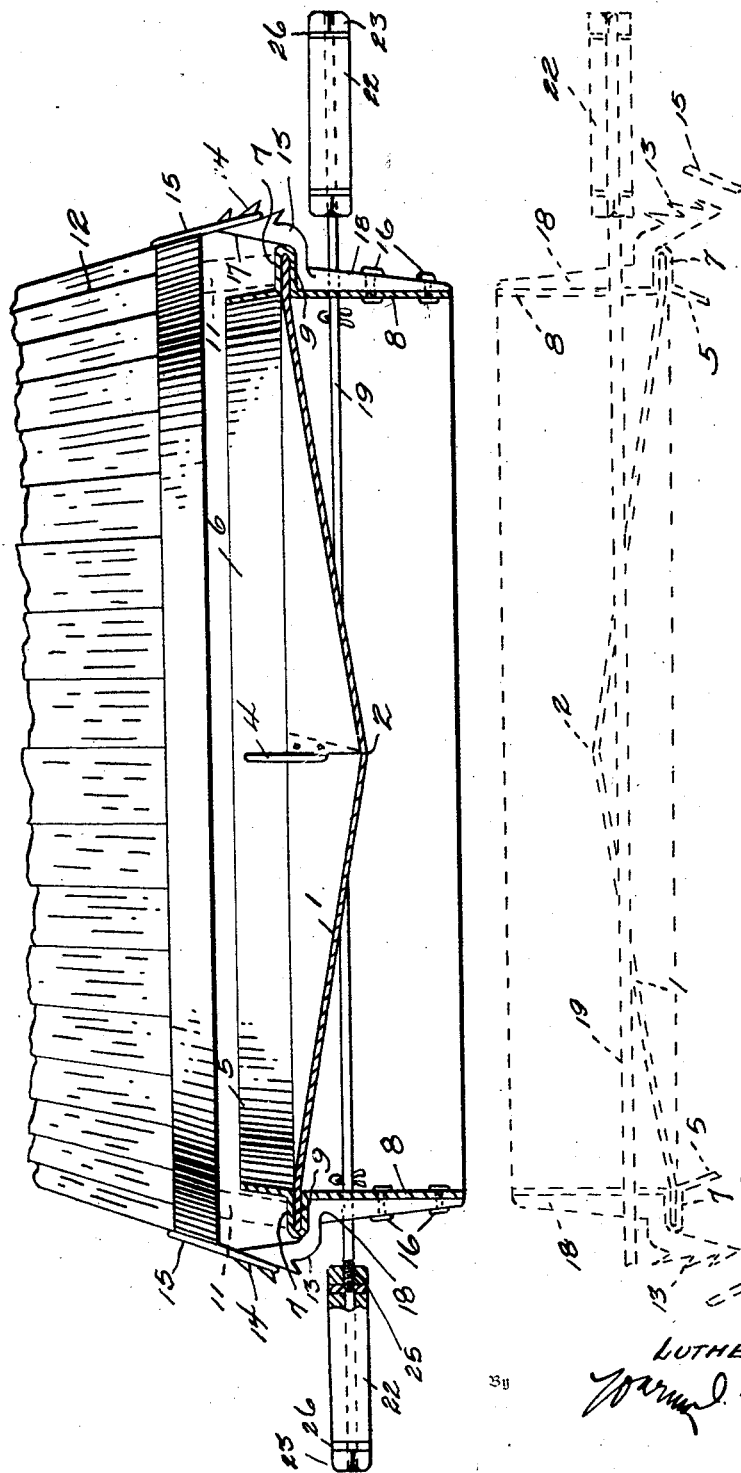

1,692,625

UNITED STATES PATENT OFFICE.

LUTHER HENRY CASKEY, OF MARTINSBURG, WEST VIRGINIA, ASSIGNOR TO CASKEY TURN-KWIK CORPORATION, OF MARTINSBURG, WEST VIRGINIA, A CORPORATION OF WEST VIRGINIA.

MEANS AND METHOD OF PACKING FRUITS, VEGETABLES, AND OTHER PRODUCTS.

Application filed February 18, 1928. Serial No. 255,399.

My present invention, in its broad aspect, has reference to improvements in packing devices for fruits, vegetables and other agricultural and horticultural products, and the like; and more particularly it is my purpose to provide means and a novel method whereby such products may be more quickly, easily and cheaply packed in baskets and similar containers. It has long been the practice in the art of packing fruit, vegetables, and like products to build up the predetermined bulk of products to be packed in inverse order to the final arrangement of such products in the commercial container, as for instance, the basket; the basket is then usually placed bottom-up upon the initially packed load and the entire assembly turned about, either mechanically or by hand, or up-ended so that the facing layer of fruit, vegetables or the like, which according to this practice is the first layer assembled is the topmost layer of the commercial container or basket. By assembling the contents of the basket, or other commercial container, in inverse order to its arrangement when finally placed in the basket, a more even, uniform pack is obtained with less effort and with less likelihood of bruising or injuring the fruit or the like.

Some means for accomplishing the above ends with which I am familiar include mechanically reversible tables or platforms upon which the load is assembled in inverse order; other devices attain similar ends by assembling the quantity of fruit or vegetables to be packed on what is termed a "facing form", and about which is placed a liner and a temporary packing tub or former, or retainer, which is subsequently removed and replaced with a basket or other commercial container, and the whole reversed or up-ended and the "facing form" removed. Still others contemplate the use of means for assembling the facing layer, and upon which the commercial container is then placed (its bottom being removed, or opened up) and filled, after which the bottom is replaced (or sealed) and the whole assembly inverted, or up ended; the means for forming the facing layer is then removed and the top of the commercial container—such as a barrel, box, or other container—applied and secured down.

My present invention has to do with improved means for assembling the facing layer and forming a base or temporary foundation for the initial packing of fruit, vegetables, or the like, when the inverse order of packing is followed; and it may be used with that type of commercial container wherein the bottom is applied after the container is filled, or with heavy card-board or corrugated-board, or other similar liner means as a former for the initial packing and which subsequently becomes the liner of the basket, crate, or other container when the load has been completed and the container has been applied bottom-up and ready for the reversing process; or it may be used with a special former, or packing tub, and a liner. In practice when used with that type of container having a bottom capable of being opened up or removed, the container is mounted directly on my assembling device, and when filled the bottom is replaced or sealed up and the whole reversed or up-ended, and then headed; when used with a heavy liner alone, the liner is mounted directly on my assembly device and filled whereupon the final container is applied and the whole reversed or up-ended; and when used with a special former or packing tub and liner, the loading is completed and the former or packing tub removed, the final container applied, and the assembly reversed or up-ended.

Having pointed out the general application of my device; I specially emphasize the following principal objects and advantages which are peculiar to its special and novel construction; first, the floor or body of my device is formed of a single piece of sheet metal; second, the entire rim structure and this includes the corrugated retaining wall, the floor retaining channel, and the base or supporting flange is formed of a single piece of sheet metal; third, but two operations are required to assemble the floor and rim structure and they are; 1st, the bending of the rim structure about the floor with the edge of the floor retained in the channel and; 2nd, riveting the meeting ends of the rim structure together; fourth, means are provided for engaging the handles or other parts of the basket, or other container, or handling devices therefor, so that the basket or container is retained upon my assembly device while the inverting or up-ending operation is carried out, and these engaging means are capable of adjustably retaining handles and the like; fifth, a special reversing device is provided which consists in a handling rod which is off-center with respect to the dead weight of the load so that immediately the load (consisting of my assembling device, the packed fruit or vegetables, and the final container) is lifted it will automatically swing about the handling rod as an axis to its upright position, and; sixth, the retaining means constitute bearings and reinforcements for the handling rod.

Of the advantages enumerated I am inclined to believe that the latter two are among the most important from the standpoint of practical handling, since it has been necessary heretofore to grip with the hands both the assembling device or facing form and the handles or edges of the basket, or other container, and then arduously swing the whole load by main strength, and from an akward position, to its upright position. Accordingly my invention consists first in the means for assembling the products to be packed, and then the method of handling those products so that the least effort is expended to carry out the operation of inverting the load after it is packed.

In the drawings wherein is illustrated the preferred form of my invention;—

Figure 1 is a detail view, partly in section, of my device with a basket applied thereto in the position which it assumes before the load is inverted, and in dotted lines is shown the inverted position;

Figure 2, views A, B and C, show the operation of inverting the load after the products have been packed and the basket applied;

Figure 3 is a top plan view of my assembling device;

Figure 4 is a perspective view of my container attaching or fastening dog, and the bearing opening is shown therein for the handling rod, and Figure 5 is a sectional detail view of the manner of attaching the floor to the rim assembly.

In the drawings wherein like characters of reference are used to designate like or similar parts throughout the several views;—

The numeral (1) designates the slightly conical floor of my assembling device which is formed by slitting a circular piece of sheet metal to its center (2) and then bringing together, overlapping, and riveting together the edge portions of the slit as at (3). A guide member (4) is preferably riveted between the overlapping edges to assist in properly arranging the rows of fruit, vegetables, or the like, used in the facing layer. The rim assembly of my device comprises a strip of circularly bent sheet metal having a slightly inclined and corrugated portion (5) constituting the retaining wall of the hopper portion (6) of my device, a U-shaped channel bead (7) in which the edge of the floor (1) is inserted when assembled to be retained thereby (as shown in Figures 1 and 5) and a base or depending supporting flange portion (8). The base flange is sufficiently wide to raise the floor of my device considerably above any base upon which it rests. In assembling the floor (1) and rim member, the rim is simply bent about the floor with the edges thereof retained in the channel as at (9), and the overlapping ends of the rim riveted together as at (10). This forms a rigid, simple, cheap and durable structure.

In practice my device is placed on a suitable base, such as the floor of a packing shed, with the supporting or base flange portion (8) lowermost, and the hopper portion (6) in position to receive the articles to be packed thereon, as for instance the facing layer of fruit, and subsequent layers, such position being shown in full lines in Figure 1, the facing layer (not shown) is then arranged on the floor (1), and the bottom-less container, heavy liner, or combination of liner and packing tub, seated on the channel, as shown in dotted lines at (11) in Figure 1. The load of fruit, vegetables or the like is then built up on the facing layer and retained in place by the liner, or combination of liner and packing tub, or by the container itself when a removable or unsealable bottom container is used, and when completed the final container is applied (when the liner, or the combination of liner and packing tub is used) as for instance a basket (12) and the whole inverted in a manner which will hereinafter appear.

However, since the packing operation according to this method necessitates bodily lifting and turning the load, and since this is an arduous and time consuming task, I have provided a pair of securing or fastening dogs (13), each having a plurality of teeth (14) with any of which the handles (15) of the basket (12) or any other type of handling means for a container may be engaged to hold the container or basket upon my assembling device while it is being up-ended, thereby eliminating the necessity of gripping both the assembling device and container with the hands to hold them together when the load is inverted or up-ended. My dogs (13) are riveted to the supporting or base flange (8) as at (16) or otherwise suitably secured thereto and they are inclined outwardly as shown by the position of the rear edges (17) thereof with respect to the hopper. The shank portion (18) of each dog fits under the channel bead (7) and extends, preferably, from the channel bead to the bottom edge of the flange (8) and the toothed portion extends somewhat above the top edge of the retaining wall (5). The handling rod (19) which is my reversing or up-ending device extends completely through the base of my device and outwardly from both sides, and is prevented from sliding longitudinally by a pair of cotter pin. Openings (20) are provided in the supporting or base flange (8) to loosely mount the rod (19), and it is positioned off-center with respect to the dead weight of the load, or to one side of the center point (2) of the floor (1). The shanks (18) of the dogs (13) are provided with bearing openings (21) for loosely receiving the rod, as shown in Figure 4, and the protruding ends of the rod have loose or rotating handles (22) secured in place by nuts (or other suitable means) designated (23) and (24) on screwthreaded portions, as at (25), or the like, on the rod. Suitable thrust washers (26) may also be used to insure free movement of the handles, and prevent binding. If desired the dogs (13) may not be used to provide reinforced bearings for the rod, in which case the openings (21) are omitted, and the dogs may be placed at any other points on the flange (7).

It will therefore be seen that to invert the load it is simply necessary to grasp the handles as shown at view A of Figure 2, and slightly lift the same, whereupon the load (represented by my device), the packed fruit and the container, will turn or swivel on the rod (19) as an axis. The direction of movement of the load may be either away from the operator or toward the operator as indicated by the two arrows in view A of Figure 2, depending on how the handles are gripped. In view B of Figure 2, the load is shown automatically swinging on the rod (19), and in view C of Figure 2, the container and its contents have been completely inverted from the packing position and brought to a position of rest with the top uppermost. Emphasis is laid on the fact that to invert the load represented by my assembling device; the packed products; and the basket or other container; lifting force alone is neessary. All other forces necessary to complete the turning moment of the load are induced by setting the axis of the rod off-center with respect to the dead weight or center of inertia. When the load has been inverted and the basket or other container is right-side-up, it is merely necessary to release the handles, as shown in dotted lines in Figure 1, from the dogs (13) and remove my assembling device and replace it with the usual container top.

The conical or dished formation of the floor (1) affords the desired crown in the contents of the container and the reversing operation and slight jarring tends to shake down the contents so that the respective items assume their proper relative positions without crowding or bruising. The shrinkage in bulk due to shaking down, or settling, is usually appreciable and for this reason when a basket or the like is used it does not come completely down to my assembling device but is slightly spaced therefrom as shown in Figure 1, and furthermore it necessitates the use of several teeth instead of one tooth in conjunction with the dogs (13) so that adjustments may be made to suit individual packing needs.

It is believed that the operation and advantages of my packing device are apparent from the foregoing, especially upon inspection of the diagrammatic, step-by-step, showing of Figure 2, but emphasis is again laid upon my means of securing the container to the assembling device by means of dogs, or other adjustable fasteners; my novel means of inverting the load by setting the handling rod (19) off-center with respect to the dead weight or center of inertia; and my manner of forming the assembling device of but few, simple and readily assembled parts which are not likely to become broken, can be replaced from time to time if necessary, and which can be cleaned with ease and facility. Furthermore, the adaptability of my assembling device to various known means of packing according to the inverse process will be obvious to one skilled in the art.

While in the foregoing, there has been illustrated in the drawings and described in the specification such combination and arrangement of elements as constitute the preferred embodiments of my packing device, it is nevertheless desired to point out the fact that interpretation of the scope of the inventive concept should only be conclusive when made in the light of the subjoined claims.

I claim:—

1. Means for reverting the position of an inverted load, comprising a handling device set off-center with respect to the center of dead weight of the load and formed to permit the load to swing freely through an angle of 180°, thereby to completely revert the load about the handling device as an axis when the load is lifted from a support.

2. A packing device of the type defined, comprising a support, and a handling device connected with the support and set off-center with respect to the center of dead weight of the load and support, thereby to automatically swing the load and support about the handling device to invert it when the same is lifted and thereby free to move.

3. A packing device of the type defined, comprising means on which the articles packed are placed, a handling device connected with the means and free to rotate with respect thereto, said handling device being off-center with respect to the center of dead weight of the means and the load represented by the articles packed, thereby to automatically invert the means and the articles packed with the assembly is lifted from a support.

4. A packing device of the type defined, comprising a member on which the packing operation is carried out, and a rotatable rod extending through said member and off-center with respect to the dead weight of the member and load, to invert the member and load when the member is lifted up by means of the rod.

5. Means for inverting the position of packed articles, comprising a member on which the packed articles are retained, and a handling device rotatably mounted on the member and off-center with respect to the member and with respect to the dead weight of the packed articles, thereby to invert the same automatically through an induced turning moment.

6. A packing device comprising a floor formed of a single sheet of metal, and a support and retaining wall about the floor formed of a single sheet of metal adapted to extend and grip the edges of the floor to hold the same in position.

7. An article of manufacture adapted for use in packing fruits and vegetables, comprising two pieces of sheet metal, one cut in the form of a circle to form the floor, and the other cut in the form of an elongated rectangular strip and bent about the floor to grip its edges.

8. An article of manufacture adapted for use in packing fruits and vegetables, comprising two pieces of sheet metal, one cut in the form of a circle and split to its center and riveted to form a conical floor, and the other cut in the form of an elongated rectangular strip, having a channel bead between its long edges, and bent about the floor to grip its edges in the channel bead, and having its meeting and overlapping ends riveted together.

9. A packing device comprising a member on which the articles are packed in a container in the inverted order, and toothed dogs carried by the member and certain of the respective teeth of which are adapted to be engaged by the handles of the container of the packed articles to hold the container on the member when the load is inverted.

10. A packing device comprising a member on which the articles are packed in the inverted order, said member comprising a dished floor and a rim including a supporting flange, and a pair of fixed attaching dogs having teeth normally projecting downwardly and mounted on the rim and certain of which are adapted to be engaged by the handles or the like of the container for the packed articles thereby to hold the container on the member when the load is inverted.

11. A packing device comprising a member on which the articles are packed in the inverted order, said member comprising a conical floor and a supporting member for the floor having an upstanding rim forming a hopper above the floor, a handling device for inverting the member comprising a freely rotatable rod carried off-center with respect to the center of dead weight of the member and the load, and dogs, each having a plurality of teeth, and carried on the supporting member to engage with the container for the articles packed thereby to hold the container on the member when the load is inverted.

12. Means for packing fruit and vegetables, comprising a supporting member on which the facing layer of fruit or vegetables is adapted to be packed, and on which means for retaining the fruit or vegetables to be packed is adapted to be mounted, means for retaining the container for the packed products carried by the supporting member to hold them together, and a handling device set off-center with respect to the dead weight of the load and rotatably mounted on the member for inverting the member, the packed products and the container automatically through in induced turning moment.

13. A basket packing device comprising a one-piece frame formed with a supporting flange, a concave floor carried by the frame, toothed dogs on the frame, and a handling rod mounted off-center with respect to the dead weight of the frame, said frame having an annular exterior flange for receiving thereon containers for the articles to be packed, and the handles of which engage the dogs.

14. The combination in a packing device for fruits and vegetables, of means for assembling the facing layer, means for retaining the facing layer in position, a support, attaching means on the support for engaging means for holding the fruit or vegetables assembled on the facing layer, and a freely rotatable member, said member having rotatable handles, and set-off center with respect to the dead weight of the load.

15. A packing device for fruits and vegetables comprising a conical floor, a supporting frame about the floor and having a corrugated rim above the floor and a supporting flange below the floor, said frame having a channeled bead for receiving and retaining the edges of the floor, a pair of attaching devices formed with toothed portions and shanks carried by the frame, said frame and the shanks of said attaching devices formed with registering openings, and a rod extending through the frame and having bearings in said openings, the protruding ends of said rods having rotatable handles, and the axial position of the rod being off-center with respect to the dead weight of the frame, said attaching devices adapted to engage the handles of containers placed in inverted position on the frame above the floor.

16. The method of packing fruits, vegetables and other products, consisting in assembling the products in inverted order facing layer down on a base, confining the products so packed in the container therefor, positively connecting the container with the base, and finally inverting the packed products so that the container and facing layer and the base are uppermost, by exerting a lifting moment on the base which lifting moment is off-center with respect to the center of dead weight of the load.

In testimony whereof, I affix my signature hereunto.

LUTHER HENRY CASKEY.